(12) United States Patent
Lehmann et al.

(10) Patent No.: US 6,843,856 B1
(45) Date of Patent: Jan. 18, 2005

(54) CLEANING AGENT AND METHOD FOR CLEANING ULTRAFILTRATION MEMBRANES IN ELECTROPHORETIC DIP COATING INSTALLATIONS

(75) Inventors: Horst Lehmann, Wuppertal (DE); Hans-Peter Bünger, Sinzig (DE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 293 days.

(21) Appl. No.: 10/069,036

(22) PCT Filed: Aug. 16, 2000

(86) PCT No.: PCT/EP00/07994

§ 371 (c)(1),
(2), (4) Date: Feb. 15, 2002

(87) PCT Pub. No.: WO01/12306

PCT Pub. Date: Feb. 22, 2001

(30) Foreign Application Priority Data

Aug. 17, 1999 (DE) .......................... 199 38 886

(51) Int. Cl.⁷ ................................. B08B 7/00
(52) U.S. Cl. .............. 134/10; 134/38; 134/42; 134/27; 134/28; 134/29

(58) Field of Search .............. 134/10, 27, 28, 134/29, 38, 42; 210/23 H, 23 F

(56) References Cited

U.S. PATENT DOCUMENTS 4,136,025 A    1/1979    Zwack et al.

FOREIGN PATENT DOCUMENTS

| DE | 2842626 A1 | 4/1980 |
|----|------------|--------|
| DE | 2842626    | 4/1980 |
| EP | 0255669 A1 | 2/1986 |
| EP | 0255669 A1 | 2/1988 |
| JP | 55073896   | 6/1980 |
| JP | 55073898   | 6/1980 |
| JP | 57 158398  | 9/1982 |
| JP | 57158398   | 9/1982 |
| JP | 60204898   | 10/1985 |

Primary Examiner—Zeinab El-Arini
(74) Attorney, Agent, or Firm—Steven C. Benjamin

(57) ABSTRACT

Aqueous cleaning agent and its use in a process for cleaning ultrafiltration membranes in ultrafiltration units of electro-dipcoating plants, which cleaning agent contains electro-dipcoating lacquer (EDL) binders overneutralized with neutralizing agent.

25 Claims, 1 Drawing Sheet

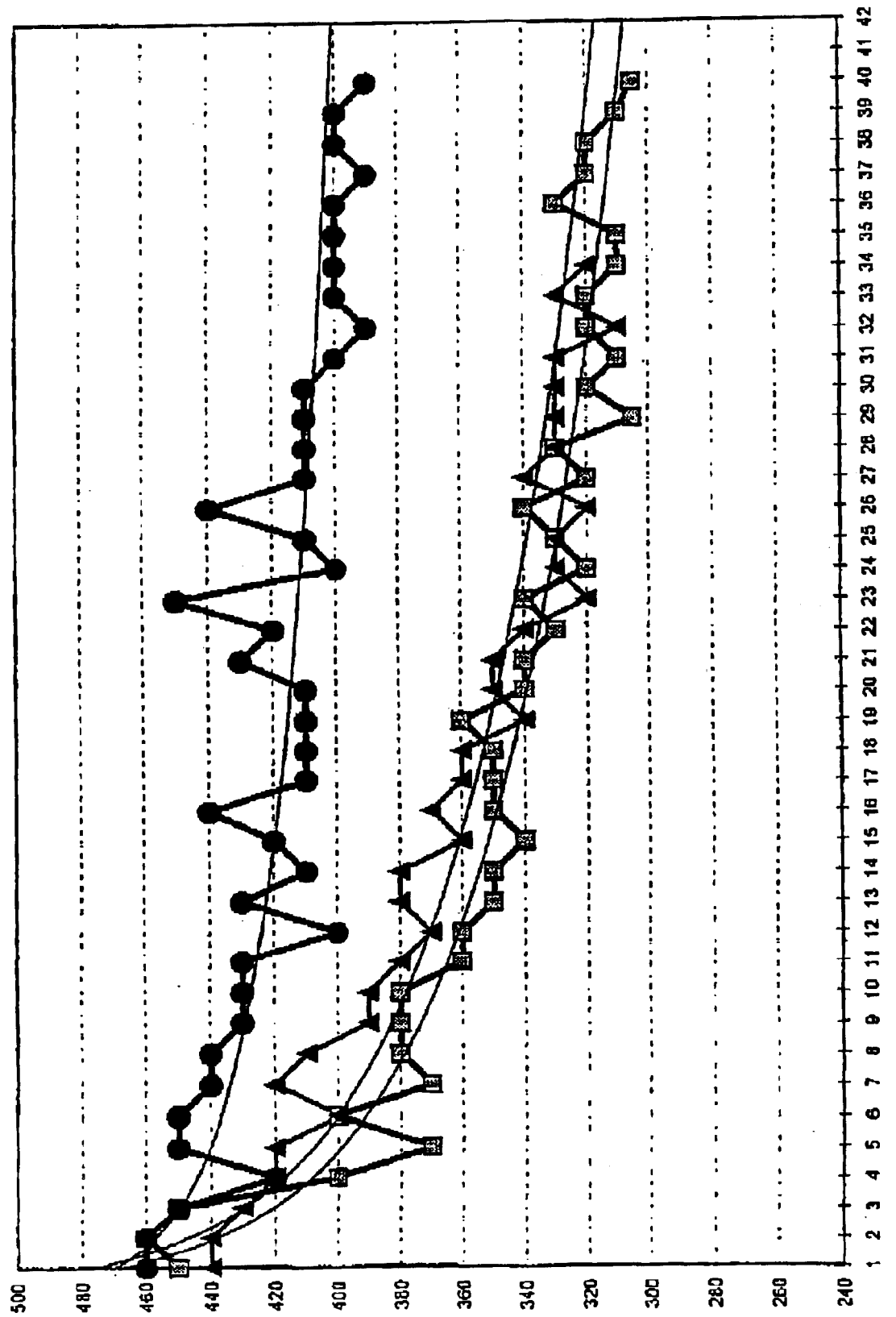

CLEANING AGENT AND METHOD FOR CLEANING ULTRAFILTRATION MEMBRANES IN ELECTROPHORETIC DIP COATING INSTALLATIONS

BACKGROUND OF THE INVENTION

The invention relates to cleaning agents for ultrafiltration membranes in ultrafiltration units of electro-dipcoating plants. The invention relates also to a process for cleaning ultrafiltration membranes using the cleaning agents.

Electro-dipcoating (EDC) is widely used in industrial lacquering both as anodic dipcoating (ADC) and, especially, as cathodic dipcoating (CDC). In particular, it is used, for example, as CDC in the automotive industry for applying the anticorrosive primer coating layer to motor vehicle bodies. The EDC baths are coupled with an ultrafiltration unit having one or more ultrafiltration modules, in which unit the electro-dipcoating lacquer (EDL) is subjected to membrane pressure filtration at, for example, from 1 to 5 bar (initial pressure at the ultrafiltration module). During the ultrafiltration, the EDC coating composition is separated at a semi-permeable membrane into a concentrate, which is fed back into the EDC bath, and an EDL ultrafiltrate (permeate). The EDL ultrafiltrate has only a low solids content of, for example, from greater than 0 to less than 0.5 wt. %. It consists mainly of water, and it contains to a subordinate degree constituents of the electro-dipcoating lacquer that pass through the membrane, such as neutralising agents, dissolved salts, organic solvents and low molecular weight binder constituents. The EDL ultrafiltration has two functions. On the one hand, the EDL ultrafiltrate that is obtained is used to rinse non-adhering EDC lacquer from the EDL-coated substrates after they emerge from the EDL coating bath. After rinsing, the EDL-coated substrates are conveyed to the stoving furnace of the EDC plant. The EDL rinsed off with the EDL ultrafiltrate is fed back to the EDC bath again. The second function of the EDL ultrafiltration is that of keeping the composition of the EDC bath constant within a certain tolerance, which is achieved by the discarding of a portion of the EDL ultrafiltrate that is not used as rinsing agent. In that manner, it is possible to prevent disruptive constituents that pass through the membrane from building up in the EDC bath.

The separating membranes within the ultrafiltration modules of EDL ultrafiltration units require cleaning at intervals and, generally, also conditioning (impregnation) before being used for their intended purpose. U.S. Pat. No. 4,136,025, for example, describes a process for cleaning membranes within CDL ultrafiltration units using an aqueous solution of an acid containing a water-soluble organic solvent. The example mentioned in U.S. Pat. No. 4,136,025 gives the following as the composition of the aqueous cleaner solution:

7.5 wt. % butyl glycol,
5.7 wt. % 88% aqueous lactic acid, and
86.8 wt. % deionised water.

The cleaning action of such cleaning agents of the prior art consisting essentially of neutralising agent, water and organic solvent is in need of improvement. For example, it has been found that, following membrane cleaning using cleaning agents having such a composition, the performance of the EDL ultrafiltration units declines ever more rapidly from cleaning interval to cleaning interval in the sense of an exponential function, that is to say the cleaning intervals become shorter from one cleaning operation to the next until cleaning is no longer worthwhile and the membrane or the ultrafiltration modules containing the membrane have to be replaced. In addition, the performance of the EDL ultrafiltration units becomes poorer and poorer from cleaning interval to cleaning interval as compared with the performance following each preceding cleaning operation. Such disadvantages of the use of cleaning agents of the prior art are particularly pronounced in connection with the cleaning of modem EDL ultrafiltration modules of compact construction.

The object of the invention is to provide cleaning agents that are more effective as compared with the prior art, and processes for cleaning EDL ultrafiltration membranes.

The object can be achieved if aqueous cleaning agents containing EDL binders overneutralised with neutralising agent are used for the cleaning of EDL ultrafiltration membranes, for example ultrafiltration membranes contained in EDL ultrafiltration modules of EDL ultrafiltration units.

SUMMARY OF THE INVENTION

The invention provides aqueous cleaning agents that can be used for the cleaning of EDL ultrafiltration membranes and that contain EDL binders overneutralised with neutralising agent. The aqueous cleaning agents may be either aqueous cleaning agents that can be used for the cleaning of ADL ultrafiltration membranes, which agents contain ADL binders overneutralised with base, or they are aqueous cleaning agents that can be used for the cleaning of CDL ultrafiltration membranes and that contain CDL binders overneutralised with acid.

BRIEF DESCRIPTION OF THE DRAWING

FIG. 1 shows curves showing the fall in the ultrafiltration performance with time of the CDL ultrafiltration module cleaned according to Examples 3, 4 and 5.

DETAILED DESCRIPTION OF THE INVENTION

It is fundamental to the invention that the cleaning agents according to the invention contain, in addition to water, EDL binders, for example corresponding to a solids content of from 5 to 35 wt. %. The content of EDL binders in the cleaning agents according to the invention is preferably from 10 to 30 wt. %, particularly preferably from 15 to 28 wt. %.

The ADL binders contained in the cleaning agents according to the invention for the cleaning of ADL ultrafiltration membranes are conventional ADL binders carrying anionic groups or groups that can be converted into anionic groups, for example COOH, $SO_3H$ and/or $PO_3H_2$ groups. COOH groups are preferred. The acid numbers of such resins are, for example, from 35 to 300 mg KOH/g. The weight-average molar mass (Mw) of the resins is preferably from 300 to 10,000. Examples of ADL binders are polyesters, epoxy resin esters, (meth)acrylic copolymer resins, maleate oils or polybutadiene oils. The ADL binders can be self-crossliiking or can be used in admixture with known cross lining agents. Examples of such crosslinking agents are aminoplastic resins, for example based on triazine, crosslinking agents containing transesterifiable groups, or blocked polyisocyanates.

The CDL binders contained in the cleaning agents according to the invention for the cleaning of CDL ultrafiltration membranes are conventional CDL binders containing cationic groups or basic groups that can be converted into cationic groups, for example amino, ammonium, e.g. quaternary ammonium, phosphonium and/or sulfonium groups. Preference is given to CDL binders having basic groups, particularly preferably having nitrogen-containing basic groups, such as amino groups. Such basic resins are, for example, resins containing primary, secondary and/or tertiary amino groups. Some or all of the tertiary amino groups may be present in quaternised form. The amine numbers of such resins are, for example, from 20 to 250 mg KOH/g. The weight-average molar mass (Mw) of the resins is preferably from 300 to 10,000. Examples of CDL binders are amino (meth)acrylate resins, aminopolyurethane resins, polybutadiene resins containing amino groups, aminoepoxy resins, and also epoxy resin-carbon dioxide-amine reaction products. The CDL binders can be self-crosslinking or can be used in admixture with known crosslinking agents. Examples of such crosslinking agents are aminoplastic resins, crosslinking agents having terminal double bonds, polyepoxy compounds, crosslinking agents having cyclic carbonate groups, crosslinking agents containing transesterifiable and/or transamidatable groups, and, especially, blocked polyisocyanates.

In connection with the cleaning agents according to the invention, the term "EDL binders" means EDL binders as such or EDL binders plus crosslinking agents for the EDL binders. The cleaning agents according to the invention can, therefore, contain EDL binders, for example self-crosslinking EDL binders, or EDL binders and crosslinking agents.

It is preferred for the cleaning agents according to the invention to contain the same EDL binders and, optionally, crosslinking agents as the EDL baths whose ultrafiltration systems are cleaned using the cleaning agents according to the invention.

In addition to water and EDL binders, the aqueous cleaning agents according to the invention contain neutralising agents corresponding to an overneutralisation of the EDL binders, for example corresponding to a degree of neutralisation of the EDL binders of from more than 100 to 1000%. Preferred examples of bases used as neutralising agents for ADL binders are bases conventionally employed in ADL's, such as amines or amino alcohols. Preferred examples of acids used as neutralising agents for CDL binders are acids conventionally employed in CDL's, such as organic monocarboxylic acids, such as, for example, lactic acid, formic acid, acetic acid, or sulfonic acids, such as, for example, amidosulfonic acid, N-alkylamidosulfonic acid, methanesulfonic acid. It is preferred for the cleaning agents according to the invention to contain the same neutralising agents as the EDL baths whose ultrafiltration systems are cleaned using the cleaning agents according to the invention.

The aqueous cleaning agents according to the invention can contain organic solvents, for example preferably in an order of magnitude as in the EDL bath, for example of up to 10 wt. %, preferably from 0 to 5 wt. %. Particularly preferably, they contain from 0 to less than 1 wt. % organic solvents. Examples of organic solvents are especially water-soluble organic solvents, such as glycol ethers, for example butyl glycol, ethoxypropanol; alcohols, such as isopropanol, isobutanol, n-butanol. If the cleaning agents according to the invention contain organic solvents, it is preferred for them to contain the same solvents as the EDL baths whose ultrafiltration systems are cleaned using the cleaning agents according to the invention.

The cleaning agents according to the invention can be prepared by mixing together, in the desired relative proportions, EDL binders and, optionally, crosslinking agents, neutralising agents and water as well as, optionally, organic solvents. Instead of water, it is also possible to use EDL ultrafiltrate. For example, the cleaning agents according to the invention can be prepared by mixing together, in the appropriate relative proportions, an aqueous EDL dispersion containing underneutralised or completely neutralised EDL binders and, optionally, crosslinking agents, and neutralising agents in an amount sufficient to overneutralise the EDL binders, water (or EDL ultrafiltrate) and, optionally, organic solvents.

EDL dispersions are aqueous dispersions of EDL binders and, optionally, crosslinking agents for the EDL binders. The EDL binders are present in the EDL dispersions in a form neutralised with neutralising agent. They may be underneutralised or completely neutralised. Complete neutralisation is here not to be confused with 100% neutralisation, but is always less than 100%. Complete neutralisation is present when the afore-described amount of neutralising agent has been used for neutralising the EDL binders, and corresponds, in the case of both ADL binders and CDL binders, to degrees of neutralisation of, for example, from 40% to, for example, not more than 60%, based on the BDL binder as such. When complete neutralisation is exceeded, the term overneutralisation is used. EDL dispersions have solids contents of, for example, from 30 to 45wt. % and a content of organic solvents of preferably less than 5 wt. %, based on the dispersion solids.

EDL dispersions can be prepared by synthesising EDL binders in the presence or absence of organic solvents and converting the resulting binders into an aqueous dispersion by dilution with water of the EDL binders previously neutralised with neutralising agent. The EDL binder(s) may be present in admixture with one or more suitable crosslinking agents and can be converted into the aqueous dispersion together therewith. Organic solvent, where present, can be removed to the desired content before or after the conversion into the aqueous dispersion, for example by distillation in vacua. It is possible to avoid the subsequent removal of solvents if, for example, the EDL binders optionally present in admixture with crosslinking agents are neutralised with neutralising agent in the low-solvent or solvent-free state, for example in the form of a solvent-free melt at temperatures of, for example, up to 140° C., and are then converted into the EDL dispersion with water. It is likewise possible, for example, to avoid the removal of organic solvents if the EDL binders are used initially in the form of a solution in a radically polymerisable, olefinically unsaturated monomer, or the binder synthesis is carried out in a radically polymerisable monomer (e.g. styrene) as solvent, conversion into an aqueous dispersion is then carried out by neutralisation with neutralising agent and dilution with water, and the radically polymerisable monomer is subsequently removed by polymerisation.

The cleaning agents according to the invention can be used for cleaning EDL ultrafiltration membranes. Accordingly, the invention relates also to a process for cleaning EDL ultrafiltration membranes using the cleaning agents according to the invention.

The process according to the invention is suitable for the cleaning of membranes in EDL ultrafiltration systems, irrespective of the type of ultrafiltration module in question. Examples of different types of EDL ultrafiltration modules are plate-type ultrafiltration modules, tubular ultrafiltration modules, tube-bundle ultrafiltration modules, as well as spiral wound ultrafiltration modules, which are particularly compact in construction.

The process according to the invention is not subject to any limitations as regards the nature of the ultrafiltration membranes, for example as regards the membrane material and the pore size, but is suitable for cleaning all ultrafiltration membranes conventionally used in BDL ultrafiltration units. Examples of membrane materials are polysulfones, polyether sulfones, polyvinylidene fluoride, polyacrylonitrile; the pore widths of the ultrafiltration membranes to be cleaned by the process according to the invention are, for example, from 5 to 600 nm.

The cleaning process according to the invention is not subject to any limitations regarding the composition of the EDL baths ultrafiltered by the EDL ultrafiltration membranes that are to be cleaned.

The cleaning of EDL ultrafiltration membranes is generally carried out whenever the ultrafiltration performance, which is expressed as the flux rate (volume of ultrafiltrate per unit time), declines markedly and falls below a defined limiting value or a defined fraction of the initial performance.

For the purposes of cleaning, the EDL ultrafiltration operation is interrupted, either with the EDL coating process being maintained or with the EDL coating process being interrupted. It is possible to maintain the EDL coating process, for example, when the EDL ultrafiltration unit has a plurality of ultrafiltration modules and only one ultrafiltration module or some of the ultrafiltration modules are cleaned by the process according to the invention, while the remaining ultrafiltration modules continue to operate in the intended manner.

If all the ultrafiltration modules are cleaned simultaneously by the process according to the invention, the EDL coating process can optionally be interrupted, for example if an inadequate supply of EDL ultrafiltrate is available for bridging the duration of the cleaning operation. For cleaning, EDL bath material present in the EDL ultrafiltration unit is rinsed out with wafer or EDL ultrafiltrate and fed back to the EDL bath. The cleaning agent according to the invention is then circulated through the EDL ultrafiltration unit.

The throughput of cleaning agent according to the invention is high; for example, the throughput of cleaning agent according to the invention circulated through an ultrafiltration module that is to be cleaned of an EDL ultrafiltration unit operated on an industrial scale may be from 2 to 20 m$^3$ per hour. Rinsing with the cleaning agent according to the invention is carried out, for example, in the same pressure range in (initial pressure at the EDL ultrafiltration module in question) as the ultrafiltration of the EDL bath material, preferably in the range from more than 1 to 2 bar. In general, the cleaning agent according to the invention is itself separated into a concentrate and an ultrafiltrate, it being preferred for the two components to be added again to the circulating cleaning agent.

The cleaning agents according to the invention can be used for the cleaning of EDL ultrafiltration membranes either immediately after their preparation, by mixing of their constituents, or after a maturing time of, for example, up to 12 hours has first been allowed to elapse. The cleaning agent according to the invention can be used for the cleaning of the EDL ultrafiltration membranes at a temperature of, for example, from 20 to 60° C., preferably from 40 to 55° C. The duration of the cleaning operation is, for example, from 5 to 24 hours. The cleaning parameters of cleaning agent throughput, pressure, temperature and duration can be worked out or optimised in each individual case by the person skilled in the art by means of simple tests.

When the cleaning operation is complete, the cleaning agent can be discarded or, if its cleaning action is still adequate, can be stored for further use in subsequent cleaning cycles.

In a preferred embodiment, the process according to the invention is carried out using an aqueous cleaning agent that contains the same EDL binder(s) and, optionally, crosslinking agent(s) as well as the same neutralising agent and, if the aqueous cleaning agent contains organic solvents, the same organic solvents as the EDL baths whose ultrafiltration systems are cleaned using the cleaning agent according to the invention. The cleaning agent then does not have to be discarded once the cleaning operation is complete, but can be added to the EDL bath in question, which contains the same binders and, optionally, crosslinking agents, the same neutralising agents and—where present—the same organic solvents. Such a procedure is particularly preferred because it does not give rise to any problems with regard to the disposal of the aqueous cleaning agents after they have been used according to the invention.

The addition of the used aqueous cleaning agent to the EDL bath causes the neutralising agent content to rise above the afore-mentioned complete neutralisation of the EDL binders, since the cleaning agent introduces overneutralised EDL binder into the EDL bath. In practice, however, that is usually of no or little significance. This becomes evident when the dimensions of industrial EDL coating plants are visualised. For example, EDL ultrafiltration systems are cleaned by the circulation of from 50 to 3000 liters of the aqueous cleaning agent according to the invention. When the cleaning operation is complete, that amount of used aqueous cleaning agent is added to the EDL bath having a volume of, for example, from 30 to 500 m$^3$, so that the increase in the neutralising agent content in the EDL bath is, ultimately, minimal. In the case of smaller baths, the amounts are correspondingly lower. If the increase in the neutralising agent content in the EDL bath cannot or is not to be tolerated, it is possible for the excess amount of neutralising agent in the EDL bath to be compensated for in the course of the solids compensation of the EDL bath that is necessary at regular intervals. During the EDL coating process, solids are discharged from the EDL bath as a result of the deposition of ED lacquer on the substrate. EDL baths therefore require regular solids compensation, which can be effected, for example, by the addition of corresponding amounts of aqueous EDL dispersion and pigment paste to the EDL bath depleted of solids. The EDL dispersion can be completely neutralised, or it is underneutralised and the amount of neutralising agent required for complete neutralisation is added separately. The afore-mentioned compensation of the excess neutralising agent in the EDL bath can, therefore, be carried out by using, in the solids compensation of the EDL bath, an appropriate amount of underneutralised EDL dispersion and/or a correspondingly smaller amount of neutralising agent in the case of the separate addition of neutralising agent.

The cleaning agents according to the invention and the cleaning process according to the invention permit effective cleaning of EDL ultrafiltration membranes. The cleaning intervals are long and the performance of the EDL ultrafiltration membranes after cleaning is high. When the cleaning process according to the invention is used, the ultrafiltration modules or membranes have a long useful life, since the fall in performance from one cleaning operation to the next described at the beginning does not occur, or its progression is substantially flatter as compared with the cleaning processes of the prior art described at the beginning.

A further advantage of the process according to the invention is that conditioning (impregnation) of the EDL ultrafiltration membrane does not have to be carried out after the actual cleaning operation; on the contrary, the EDL ultrafiltration system can be coupled with the EDL bath contents again and can resume its intended operation immediately after the cleaning operation.

EXAMPLES

Example 1

Preparation of a Cleaning Agent for CDL Ultrafiltration Membranes, Comparison

A cleaning agent for CDL ultrafiltration membranes is prepared by mixing the following constituents:
- 86 parts by weight of deionised water,
- 4 parts by weight of pure acetic acid,
- 10 parts by weight of butyl glycol The resulting mixture is warmed to 50° C.

Example 2

Preparation of a Cleaning Agent for CDL Ultrafiltration Membranes, According to the Invention A 35 wt. % CDL dispersion that has an amine content of 60 milliequivalents per 100 g of solids (solids formed by aminoepoxy resin binder and blocked polyisocyanate crosslinking agent), that contains 1 wt. % phenoxypropanol as solvent and that has been neutralised with acetic acid corresponding to a content of 30 milliequivalents of acid per 100 g of solids is mixed with 25 wt. % acetic acid and deionised water and thereby adjusted to a solids content of 25 wt. % and a degree of neutralisation of 240%, and is stirred for 3 hours at 50° C.

Example 3

Cleaning of a CDL Ultrafiltration Module Without Impregnation, Comparison

A CDL ultrafiltration module (spiral wound module) having an ultrafiltration membrane area of 16 square meters is cleaned following a drop in performance, occurring as a result of a continual CDL ultrafiltration operation, from an initial flux rate of 460 liters of ultrafiltrate per hour to 300 liters of ultrafiltrate per hour. To that end, the CDL bath material in the ultrafiltration module to be cleaned is first rinsed out with ultrafiltrate. The cleaning agent from Example 1 is then circulated through the ultrafiltration module for 14 hours at 50° C., an initial pressure at the ultrafiltration module of 3 bar and a throughput of 12 cubic meters per hour. The cleaning agent in the ultrafiltration module is subsequently rinsed out with deionised water. Rinsing with CDL ultrafiltrate is then carried out, and the ultrafiltration module is then coupled with the CDC bath contents again and normal ultrafiltration operation is resumed. The initial flux rate is 460 liters of ultrafiltrate per hour.

Example 4

Cleaning of a CDL Ultrafiltration Module With Impregnation, Comparison

Example 3 is repeated with the difference that, after rinsing the cleaning agent out of the ultrafiltration module with deionised water, impregnation of the ultrafiltration module is carried out by rinsing with a 0.5% aqueous solution of Kochkleen™ P3 (Koch, Düsseldorf). After subsequently rinsing with CDL ultrafiltrate, the ultrafiltration module is coupled with the CDC bath contents again and normal ultrafiltration operation is resumed. The initial flux rate is 460 liters of ultrafiltrate per hour.

Example 5

Cleaning of a CDL Ultrafiltration Module, According to the Invention

Example 3 is repeated with the difference that the cleaning agent from Example 2 is used instead of the cleaning agent from Example 1. Rinsing out of the cleaning agent after the cleaning operation and separate impregnation are not carried out. On the contrary, the ultrafiltration module is coupled with the CDC bath contents again and normal ultrafiltration operation is resumed. The initial flux rate is 460 liters of ultrafiltrate per hour.

DETAILED DESCRIPTION OF THE DRAWINGS

FIG. 1 shows curves showing the fall in the ultrafiltration performance with time (flux rate in liters of ultrafiltrate per hour, plotted against the duration of the ultrafiltration operation in days) of the CDL ultrafiltration module cleaned according to Examples 3, 4 and 5 (according to the invention) during the continuous CDL ultrafiltration operation resumed following cleaning.

Example 3: curve with square symbols,
Example 4: curve with triangular symbols,
Example 5: curve with circular symbols.

The ultrafiltration module cleaned according to Examples 3 and 4 show progressions that differ only insignificantly from one another.

Starting from a comparable initial level, the progression of the fall in the ultrafiltration time in the case of the CDL ultrafiltration module cleaned according to Example 5 is substantially flatter.

What is claimed is:

1. An aqueous cleaning agent for ultrafiltration membranes in ultrafiltration units of electro-dipcoating plants comprising an electro-dipcoating lacquer binder, wherein the electro-dipcoating lacquer binder is overneutralized with a neutralizing agent corresponding to a degree of neutralization of the binder of at least 100 to 1000%.

2. The aqueous cleaning agent according to claim 1, further comprising up to 10 wt-% of an organic solvent.

3. The aqueous cleaning agent according to claim 2, wherein the organic solvent is a water-soluble solvent.

4. The aqueous cleaning agent according to claim 3, wherein the water-soluble solvent is selected from glycol ethers or alcohols.

5. The aqueous cleaning agent according to claim 2, further comprising between about 0 and 5 wt-% of the organic solvent.

6. The aqueous cleaning agent according to claim 5, further comprising up to 1 wt-% of an organic solvent.

7. The aqueous cleaning agent according to claim 1, wherein the aqueous cleaning agent contains the electro-dipcoating lacquer binder in an amount ranging from 5 to 35 wt-%.

8. The aqueous cleaning agent according to claim 7, wherein the aqueous cleaning agent contains the electro-dipcoating lacquer binder in an amount ranging from 10 to 30 wt-%.

9. The aqueous cleaning agent according to claim 8, wherein the aqueous cleaning agent contains the electro-dipcoating lacquer binder in an amount ranging from 15 to 28 wt-%.

10. The aqueous cleaning agent according to claim 1, wherein the electro-dipcoating lacquer binder is selected from the group consisting of an anodic dipcoating lacquer binder and a cathodic electro-dipcoating lacquer binder.

11. The aqueous cleaning agent according to claim 10, wherein the anodic dipcoating lacquer binder has an acid number ranging from 35 to 300 mg KOH/g.

12. The aqueous cleaning agent according to claim 11, wherein the anodic dipcoating lacquer binder is selected from the group consisting of polyesters, epoxy resin esters, (meth)acrylic copolymer resins, maleate oils and polybutadiene oils.

13. The aqueous cleaning agent according to claim 11, wherein the anodic dipcoating lacquer binder is self-crosslinking.

14. The aqueous cleaning agent according to claim 11, wherein the anodic dipcoating lacquer binder further includes a cross-linking agent.

15. The aqueous cleaning agent according to claim 10, wherein the cathodic dipcoating lacquer binder has an amine number ranging from 20 to 250 mg KOH/g.

16. The aqueous cleaning agent according to claim 15, wherein the cathodic dipcoating lacquer binder is selected from the group consisting of amino(meth)acrylic resins, aminopolyurethane resins, polybutadiene resins containing amino groups, aminoepoxy resins and epoxy resin-carbon dioxide-amine reaction products.

17. The aqueous cleaning agent according to claim 15 wherein the cathodic dipcoating lacquer binder is self-crosslinking.

18. The aqueous cleaning agent according to claim 15, wherein the cathodic dipcoating lacquer binder and further includes a crosslinking agent.

19. The aqueous cleaning agent according to claim 1, wherein the electro-dipcoating lacquer binder is an anodically depositable binder and the neutralizing agent is a base.

20. The aqueous cleaning agent according to claim 19, wherein the neutralizing agent is selected from the group consisting of amine and amino alcohols.

21. The aqueous cleaning agent according to claim 1, wherein the electro-dipcoating lacquer binder is a cathodically depositable binder and the neutralizing agent is an acid.

22. The aqueous cleaning agent according to claim 21, wherein the neutralizing agent is selected from the group consisting of organic monocarboxylic acids and sulfonic acids.

23. A process for cleaning electro-dipcoating ultrafiltration membranes comprising the step of circulating the aqueous cleaning agent of claim 1 through an ultrafiltration module of an electro-dipcoating lacquer ultrafiltration unit operated on an industrial scale at a throughput ranging from 2 to 20 $m^3$ per hour, thereby cleaning the electro-dipcoating ultrafiltration membranes.

24. The process according to claim 23, further comprising adding the aqueous cleaning agent to an electro-dipcoating bath subsequent to cleaning, wherein the electro-dipcoating bath comprises the same neutralizing agent as in the cleaning agent.

25. A process for cleaning at least one ultrafiltration membrane comprising rinsing the at least one ultrafiltration membrane with the aqueous cleaning agent according to claim 1.

* * * * *

UNITED STATES PATENT AND TRADEMARK OFFICE
CERTIFICATE OF CORRECTION

PATENT NO. : 6,843,856 B1
DATED : January 18, 2005
INVENTOR(S) : Horst Lehmann and Hans-Peter Bünger It is certified that error appears in the above-identified patent and that said Letters Patent is hereby corrected as shown below:

Column 2,
Line 57, -- self-crosslinking -- instead of "self-crossliiking"
Line 58, -- crosslinking -- instead of "cross lining"

Column 5,
Line 3, -- EDL -- instead of "BDL"
Line 8, -- 100 -- instead of "600"
Line 34, -- water -- instead of "wafer"
Line 44, -- range (initial -- instead of "range in (initial"

Column 8,
Line 30, -- The curves for the ultrafiltration -- instead of "The ultrafiltration"

Column 9,
Line 32, "and" to be cancelled.

Signed and Sealed this

Tenth Day of May, 2005

JON W. DUDAS
*Director of the United States Patent and Trademark Office*